United States Patent
Salomonsson et al.

(10) Patent No.: US 10,339,707 B2
(45) Date of Patent: Jul. 2, 2019

(54) AUTOMATED GENERATION OF DIGITAL ELEVATION MODELS

(71) Applicant: OCEAN NETWORKS CANADA SOCIETY, Victoria (CA)

(72) Inventors: Peter Salomonsson, Victoria (CA); Tania Lado Insua, Victoria (CA); Yvonne Coady, Victoria (CA)

(73) Assignee: Ocean Networks Canada Society, Victoria (CA)

( * ) Notice: Subject to any disclaimer, the term of this patent is extended or adjusted under 35 U.S.C. 154(b) by 0 days.

(21) Appl. No.: 15/376,477

(22) Filed: Dec. 12, 2016

(65) Prior Publication Data

US 2017/0169605 A1    Jun. 15, 2017

Related U.S. Application Data

(60) Provisional application No. 62/265,888, filed on Dec. 10, 2015.

(51) Int. Cl.
 *G06T 17/05* (2011.01)
 *G06T 7/55* (2017.01)

(52) U.S. Cl.
 CPC .............. *G06T 17/05* (2013.01); *G06T 7/55* (2017.01); *G06T 2207/20016* (2013.01); *G06T 2207/30181* (2013.01)

(58) Field of Classification Search
 CPC ... G06Q 30/02; G06F 17/30241; G06T 17/05; G06T 7/55; G06T 2207/20016; G06T 2207/30181; G06T 2207/20221
 USPC .................................................. 382/171, 284
 See application file for complete search history.

(56) References Cited

U.S. PATENT DOCUMENTS

| | | | | |
|---|---|---|---|---|
| 8,019,736 | B1 * | 9/2011 | Postnikov | G06T 17/05 345/428 |
| 9,123,183 | B1 * | 9/2015 | Hollis | G06T 17/05 |

OTHER PUBLICATIONS

Calder, "Automatic Statistical Processing of Multibeam Echosounder Data," *International Hydrographic Review*, Apr. 2003, pp. 53-68., vol. 4, No. 1.
Calder, "On the Uncertainty of Archive Hydrographic Datasets," *Center for Coastal and Ocean Mapping*, 2004, 16pp.
Elmore and Steed, Algorithm Design Study for Bathymetry Fusion Review of Current State-of-the-art and Recommended Design Approach, *Naval Research Library*, Dec. 30, 2008, 30pp.
Salomosson, "Design of a Bathymetric Data Fusion System," *University of Victoria, Fall 2014 Work Term Report*, Dec. 11, 2014, 20pp.
"Cube Algorithm": https://confluence.qps.nl/display/KBE/CUBE+Algorith, 5 pages, Dec. 4, 2014 (retrieved Dec. 12, 2016).

* cited by examiner

*Primary Examiner* — Daniel G Mariam
(74) *Attorney, Agent, or Firm* — Klarquist Sparkman, LLP

(57) ABSTRACT

Digital elevation models are generated based on multiple sets of elevation measurements. For example, multiple sets of elevation measurements are merged to create a combined set of elevation measurements by using different merging methods, based on the resolutions of the sets within a given physical landscape. An elevation model can then be generated based on the combined set of elevation measurements by using multiple estimation processes in combination to generate estimated elevations and uncertainty values for various areas of the given physical landscape.

24 Claims, 10 Drawing Sheets

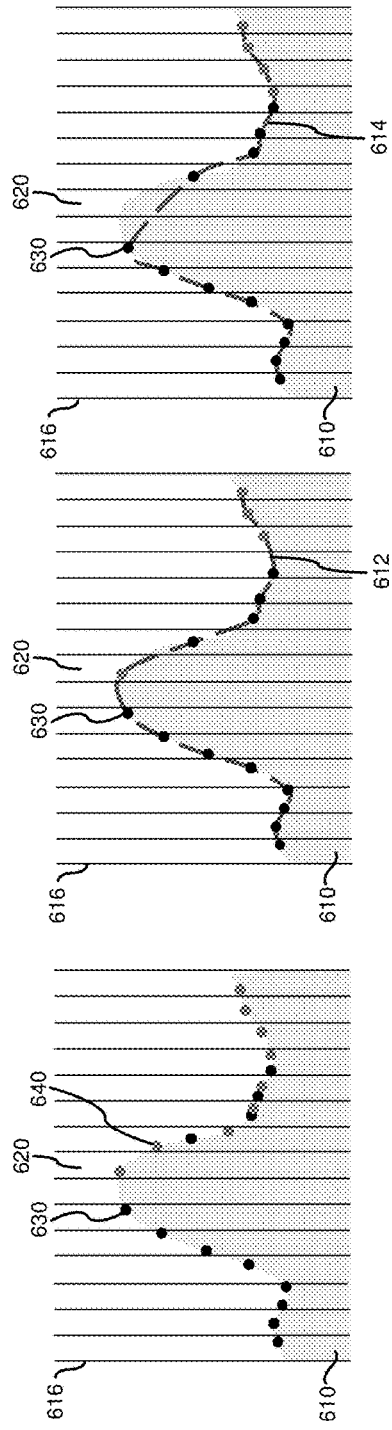
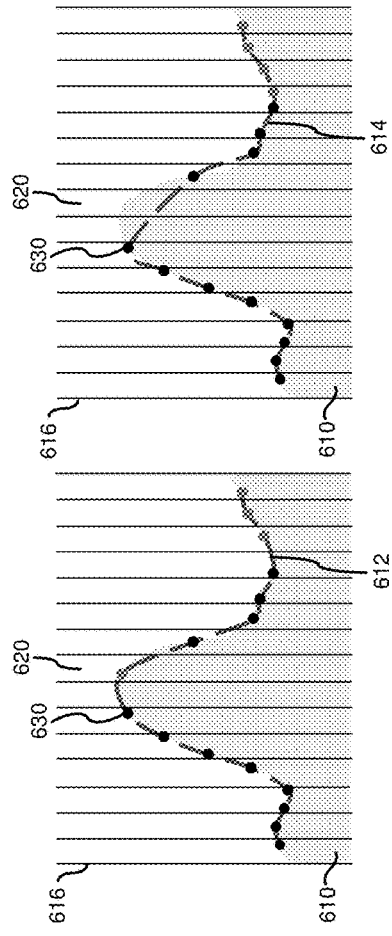
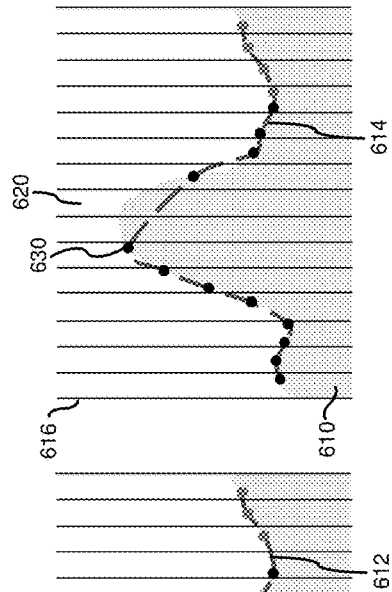
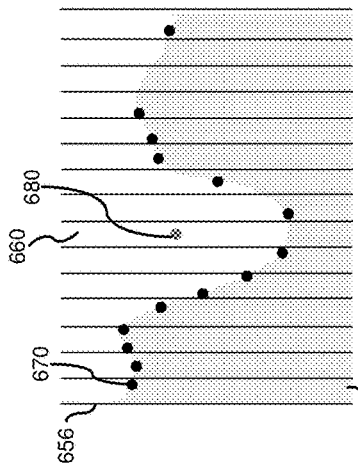
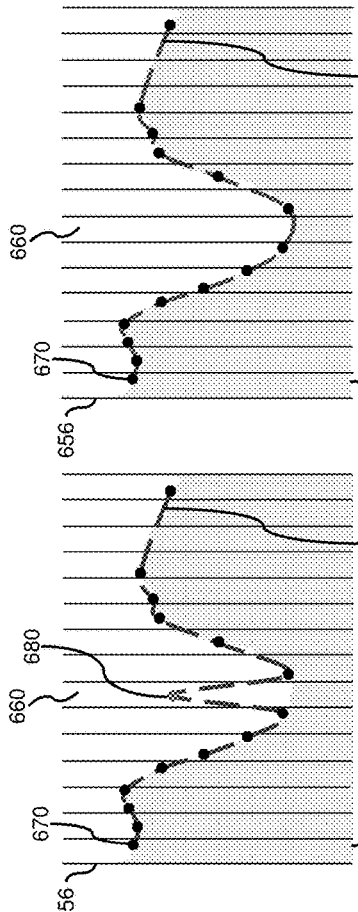
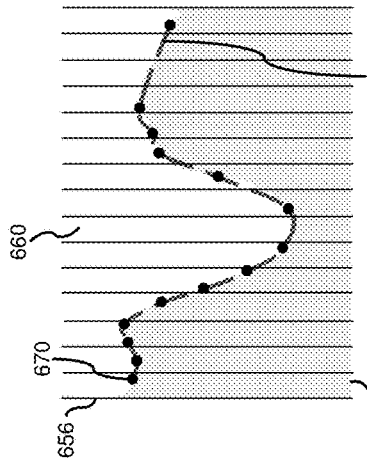

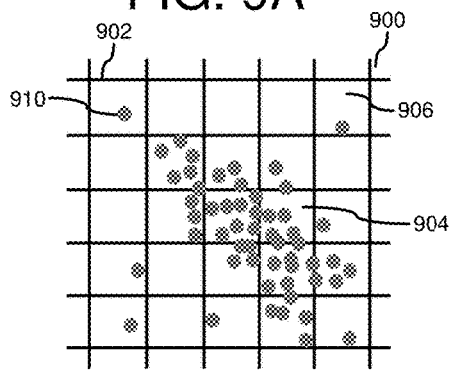
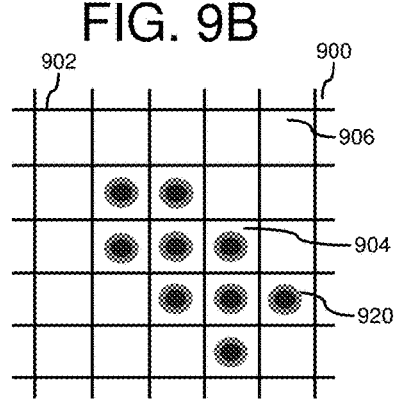
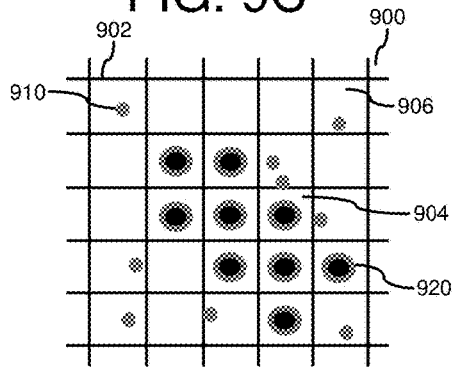
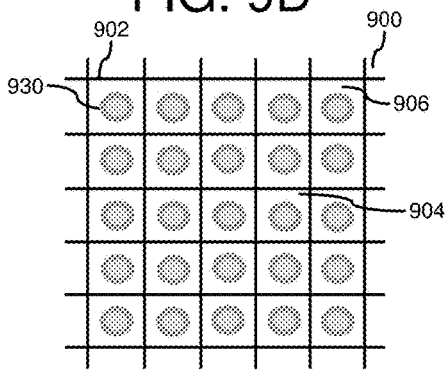
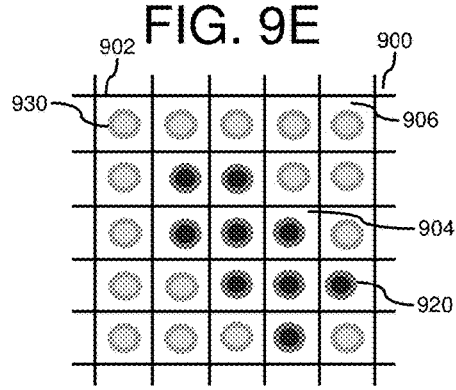

SOFTWARE 1080 IMPLEMENTING DESCRIBED TECHNOLOGIES

AUTOMATED GENERATION OF DIGITAL ELEVATION MODELS

CROSS REFERENCE TO RELATED APPLICATION

This application claims the benefit of U.S. Provisional Application Ser. No. 62/265,888, entitled AUTOMATED GENERATION OF DIGITAL ELEVATION MODELS, filed on Dec. 10, 2015, which is incorporated by reference herein in its entirety.

FIELD

The technologies described herein relate to the field of digital elevation modeling.

BACKGROUND

Digital elevation models are utilized for many tasks such as tsunami modeling, modeling water flow for hydrology, flight simulation, navigation, and archaeology. Elevation models are usually based on series or sets of elevation measurements taken at physical locations. However, many sets of elevation measurements are created by different organizations using different measuring devices, with different reference levels and are stored in different formats. Different sets of elevation measurements often have different levels of coverage as well. For instance, one set of measurements may contain a few elevation measurements spread over a large physical area, while another set of measurements may contain several measurements clustered in a small physical area.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, one or more computer readable media store computer-executable instructions for causing one or more processors, when programmed thereby, to perform operations comprising receiving a first set of elevation data points and a second set of elevation data points, wherein at least some of the elevation data points in the first set identify locations in a physical landscape and comprise elevation measurements at the identified locations, and at least some elevation data points in the second set identify other locations in the physical landscape and comprise elevation measurements at the other identified locations in the physical landscape. The operations further comprise merging the first and second sets of elevation data points to create a combined set of elevation data points according to a merging strategy. The merging strategy comprises determining a first resolution of the first set and a second resolution of the second set, determining a method for merging the first and second sets based, at least in part, on the first and second resolutions, and merging the first and second sets using the determined method.

In another embodiment, a computer comprising a processor and a memory implements an elevation model generation system comprising: a database comprising two or more groups of elevation records, wherein at least some of the elevation records comprise coordinates that identify physical locations and elevation measurements associated with the identified physical locations; and an elevation model generator. The elevation model generator is configured to perform operations comprising: receiving location information for a geographical landscape, identifying at least two of the two or more groups of elevation records that contain elevation records whose coordinated identify physical locations within the geographical landscape, based on the location information, and merging the at least two identified groups of elevation records to create a combined group of elevation records according to a merging strategy. The merging strategy comprises generating hulls for the at least two identified groups of elevation records, identifying two of the hulls that overlap in at least one area of the geographical landscape, identifying two of the groups of elevation records that are respectively associated with the overlapping hulls, calculating resolutions for the two groups of elevation records respectively associated with the two overlapping hulls, determining a method for merging the elevation records of the two groups based, at least in part, on the resolutions of the two groups, and merging the elevation records that identify physical locations in the at least one overlapping area based on the determined method.

In another embodiment, a method, in a computer system that implements an elevation model generator, comprises receiving location information that identifies an underwater terrain and at least two sets of bathymetric data points, wherein the bathymetric data points comprise geo-referenced coordinates for locations in the underwater terrain, depth measurements associated with the locations, and uncertainty values associated with the depth measurements. The method further comprises generating a grid of cells that represents the underwater terrain, wherein cells comprise geo-referenced coordinates that identify the areas the cells represent in the underwater terrain, and assigning the bathymetric data points to cells in the grid, wherein a bathymetric data point is assigned to a cell if the geo-referenced coordinates of the bathymetric data point are within the cell's area. The method further comprises merging the at least two sets of bathymetric data points according to a merging strategy to create a merged set of bathymetric data points, generating an elevation data model for the underwater terrain based on the merged set of bathymetric data points, and outputting the elevation model of the underwater terrain. The merging strategy includes generating hulls for the sets, wherein a hull for a set comprises a perimeter that encloses the geo-referenced coordinates of the set's bathymetric data points, and identifying at least one area of the underwater terrain where hulls for two of the at least two sets overlap. If the overlapping hulls have compatible resolutions, the bathymetric data points of the two sets are merged on a grid cell basis; otherwise, the bathymetric data points of the two sets are merged on a hull basis. Merging on a grid cell basis comprises: for at least some of the grid cells, determining that at least one bathymetric data point from each of the two sets are assigned to a given cell, determining which set of the two sets has the less reliable bathymetric data points assigned to the given cell, and removing the less reliable set's bathymetric data points that are assigned to the given cell. Merging on a hull basis comprises: determining which set, of the two sets, has the less reliable bathymetric data points within its respective hull, and removing the bathymetric data points of the less reliable set that are within the at least one overlapping area. The merging strategy further comprises combining the bathymetric data points of the at least two sets that have not been removed to create the merged set of bathymetric data points. Generating the elevation model of the underwater terrain comprises using a first depth estimation process to generate estimated depths and estimated uncertainty values for cells in the grid that contain a number of bathymetric data points above a specified threshold, combining the estimated depths and estimated uncertainty values generated by the first depth estimation process with the merged set of bathymetric data points, using a second depth estimation process to generate estimated depths and estimated uncertainty values for cells in the grid, based on the combined estimated depths and estimated uncertainty values generated by the first depth estimation process and the merged set of bathymetric data points, and combining the estimated depths and estimated uncertainties generated by the first and second estimation processes to create the elevation model of the underwater terrain.

As described herein, a variety of other features and advantages can be incorporated into the technologies as desired.

BRIEF DESCRIPTION OF THE DRAWINGS

FIGS. 6A-C are diagrams depicting example elevation data points, from two sets of elevation data points, in a cross-section of a representation of a physical landscape, and example results of merging the sets of elevation data points by grid cell and by hull.

FIGS. 6D-F are diagrams depicting other example elevation data points, from two other sets of elevation data points, in another cross-section of a representation of a physical landscape, and example results of merging the two other sets of elevation data points by grid cell and by hull.

FIGS. 9A-E are diagrams depicting stages in another example method for generating an elevation model of a physical landscape.

DETAILED DESCRIPTION

Example 1—Overview

Figure 1:
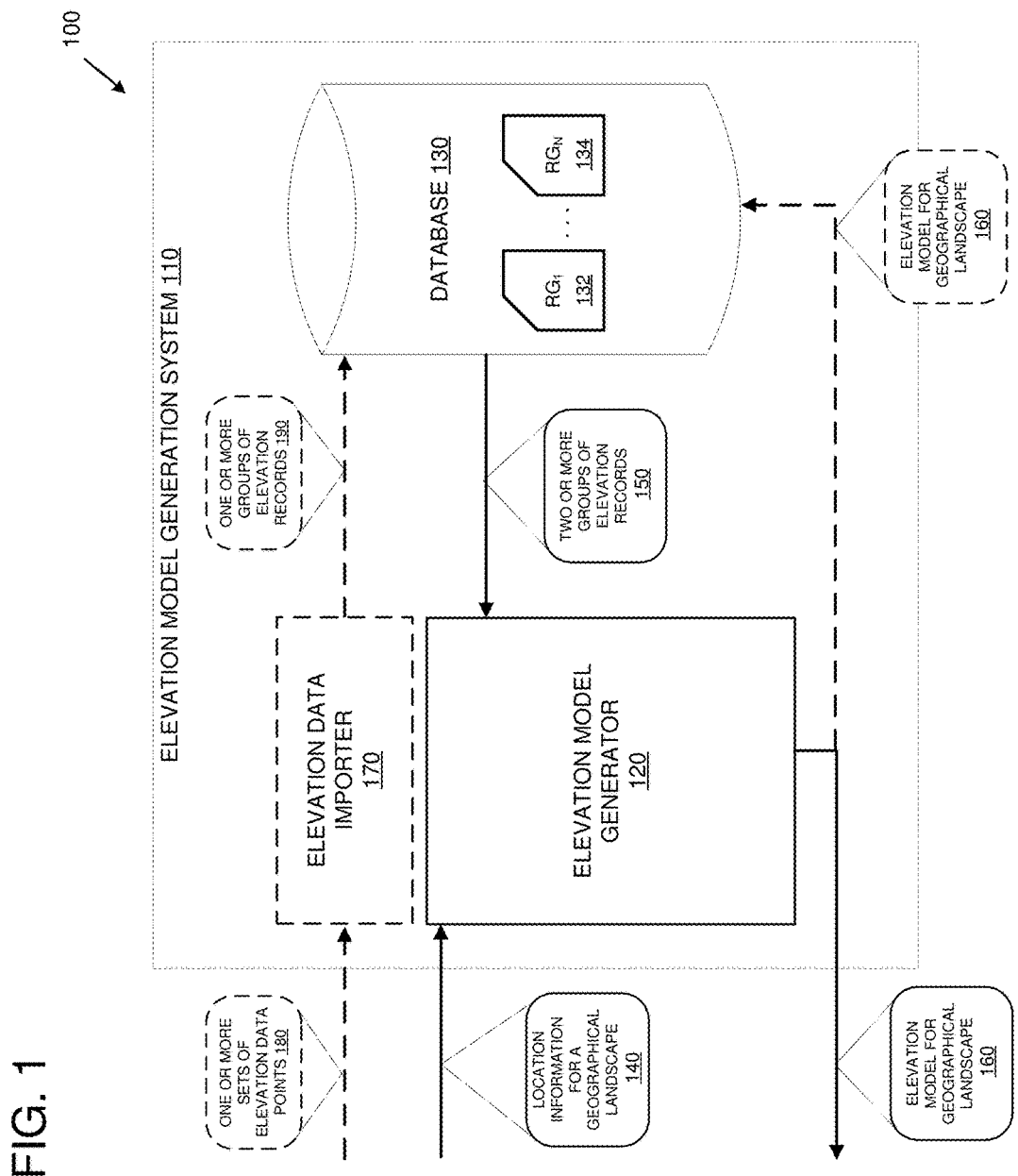
FIG. 1 is a diagram depicting an example system for generating elevation models of geographical landscapes.

Previous systems for producing elevation models based on multiple sets of elevation measurements require extensive input from experts. Therefore, there exists ample opportunity for improvement in technologies used to generate elevation models from multiple sets of elevation measurements.

The following description is directed to technologies for generating elevation models from multiple sets of elevation measurements. For example, the technologies can be applied to merge multiple sets of elevation measurements and generate elevation models based on the merged elevation measurement set using multiple elevation estimation processes.

In some examples, a request is received that identifies a geographical landscape for which an elevation model is to be generated. Groups of elevation records are stored in a database, and at least two of the groups include elevation records that identify physical locations within the geographical landscape. These groups of elevation records are merged to create a combined group of elevation records. The combined group of elevation records is then used to generate an elevation model of the geographical landscape.

Multiple sets of elevation data points, or multiple groups of elevation records, can be merged using the technologies described here. Several methods for merging sets of elevation data points are described. In certain scenarios, some of the methods for merging sets of elevation data points will result in elevation models that are more or less accurate than other methods. In some cases, the relative similarity or compatibility of the resolutions of two sets of elevation data points can be used to select a method to be used to merge the two sets of elevation data points. For instance, in at least one example, the two sets of elevation data points are merged using grid cells when a ratio between resolutions of the two sets is within a specified range. In another example, the two sets of elevation data points are merged using hulls when a ratio between resolutions of the two sets is not within a specified range.

An elevation model for a physical landscape, based on a combined set of elevation data points, can then be generated using technologies described herein. In some embodiments, multiple processes are used to generate estimated elevations that form the basis of the elevation model. A representation of a physical landscape can be divided into a grid of cells. Elevation data points, from the combined set of elevation data points, are then assigned to the cells of the grid. In at least one example, one elevation estimation process that is effective at generating elevation estimates based on a number of elevation data points greater than or equal to a certain threshold is used to generate estimated elevations for grid cells that contain a sufficient number of elevation data points. A second estimation process is used to generate elevation estimates for grid cells that were not evaluated by the first estimation process. The elevation estimates generated by both processes are then combined to create the basis for an elevation model of the physical landscape.

The technologies described herein can increase the speed at which elevation models for physical landscapes are produced from multiple sets of elevation measurements. Disparate sets of elevation measurements can be merged reliably, without manual analysis from data experts. Also, previous methods typically involved multiple iterations of model generation, with expert feedback after successive iterations. The technologies described herein can improve the performance of elevation model generation systems in some examples by eliminating the need for such iteration, thereby producing elevation models of physical landscapes using fewer processor cycles.

Example 2—System for Generating Elevation Models

In any of the examples herein, a server environment can be provided for performing operations for generating elevation models.

FIG. 1 is a diagram depicting an example system 100 for generating elevation models of geographical landscapes. Elevation model generation system 110 comprises an elevation model generator 120 and a database 130. Database 130 comprises two or more groups of elevation records $RG_1, \ldots, RG_N$, where N is a positive integer, such as representative record groups 132 and 134. For instance, elevation record groups $RG_1, \ldots, RG_N$ may represent elevation measurements taken at different times, at different places, by different organizations, using different measuring devices, or any combination thereof. In example system 100, at least some of the elevation records in record groups 132, 134 comprise coordinates that identify physical locations and elevation measurements taken at the physical locations. In some embodiments, at least some of the elevation records in record groups 132, 134 also comprise metadata that describe various aspects of the elevation records, such as the provenance of the elevation records, the reference level or levels of the elevation measurements, the coordinate system or systems of the coordinates, etc.

In some embodiments, database 130 is a relational database and the elevation records $RG_1, \ldots, RG_N$ are stored as rows in one or more tables. In alternative or further embodiments, database 130 is a spatial database configured to relate records based on geographic information, such as a database that is designed, modified, or configured to store and query records that represent objects defined in geometric space.

The coordinates of the elevation records can be global coordinates, i.e., coordinates that can identify locations anywhere on the Earth using a uniform coordinate system (e.g., coordinates based on latitude and longitude, and/or coordinates in a space-based navigation system such as the Global Positioning System (GPS)). Coordinates in a global coordinate system are sometimes referred to as geo-positional coordinates, geo-referenced coordinates, or coordinates referenced to the geoid. Alternatively, the coordinates of the elevation records can be local coordinates that identify locations in a local coordinate space, such as a topological chart, or an atlas or manifold of topological charts, wherein a chart provides a local coordinate system for a topological space.

Elevation model generator 120 is configured to receive location information for a geographical landscape 140, for which an elevation model is to be generated. Location information 140 can comprise coordinates that define a geographic area. For instance, location information 140 can comprise two sets of coordinates that define a top-left (or North-West) corner and bottom-right (or South-East) corner of the geographical area. In an alternative embodiment, location information 140 can comprise multiple sets of coordinates that define a boundary or perimeter for the geographical area. In such an embodiment, the boundary or perimeter can be a geometric shape, such as a polygon. In other embodiments, location information 140 can comprise a single set of coordinates and one or more radii that define the geographical area as a circle or ellipse. In other embodiments, location information 140 identifies a geographical area in terms of one or more well-known location identifiers, such as coastal identifiers and/or weather station identifiers. In some embodiments, a geographical landscape defined by location information 140 is referred to as a tile.

Elevation model generator 120 is further configured to identify two or more groups of elevation records whose coordinates identify physical locations within the geographical landscape. For instance, elevation model generator 120 can query database 130 based on location information 140 and receive two or more groups of elevation records 150, of the two or more record groups $RG_1, \ldots, RG_N$, that contain elevation records that identify physical locations within the geographical landscape defined by location information 140. In some embodiments, elevation model generator 120 receives only the elevation records within the two or more groups 150 that identify locations within the geographical landscape. Alternatively, elevation model generator 120 may receive all elevation records that belong to the two or more groups 150. In such embodiments, elevation model generator 120 is further configured to identify which elevation records, of the two or more groups 150, identify locations within the geographical landscape.

Elevation model generator 120 is further configured to merge the two or more groups 150 to create a combined group of elevation records and to generate elevation model 160 for the geographical landscape, using one or more of the example methods described herein. Elevation model generator 120 is also configured to output elevation model 160. Optionally, elevation model generator 120 can store elevation model 160 in database 130. In some embodiments, elevation model generator 120 is configured to associate elevation model 160 with the two or more groups of elevation records 150 in database 130.

In some embodiments, elevation model generation system 110 further comprises an elevation data importer 170. Elevation data importer 170 is configured to receive one or more sets of elevation data points 180, convert elevation data point sets 180 into one or more groups of elevation records 190, and to store the one or more elevation record groups 190 in database 130. In some cases, one set of elevation data points is converted into one group of elevation records, wherein each elevation data point is converted into an elevation record. For instance, if the elevation data points are organized into the sets 180 in the same manner in which elevation records are grouped, then there can be a direct correlation between a set of elevation data points and a group of elevation records. An example of such a scenario is one in which groups of elevation records and sets of elevation data points both represent series of elevation measurements taken within geographical areas. In other cases, there may not be a direct correlation between a set of elevation data points and a group of elevation records. For instance, a group of elevation records may represent a series of elevation measurements taken within a geographical area, while a set of elevation data points may represent elevation measurements taken by a single organization in one or more geographical areas over a period of time. In such a scenario, a single set of elevation data points can be converted into multiple groups of elevation records.

The conversion process comprises converting data point sets 180 from the format in which they are received into a common format in which groups of elevation records are stored. A format of elevation data points can affect several aspects of the way in which the elevation data points are represented. For instance, the format can dictate the manner in which data points identify physical locations, the measurement unit for the elevation data points' elevation measurements, the manner in which the elevation data points are organized, the manner in which associations between elevation data points are expressed, etc. In some cases, data point sets 180 are received in multiple formats. In such cases, the data point sets 180 are converted from the multiple formats into a common format as part of the process of converting the sets of elevation data points 180 into one or more groups of elevation records 190.

Any of the example methods described herein for merging sets of elevation data points and generating elevation models based on combined sets of elevation data points are also applicable for merging groups of elevation records and generating elevation models based on combined groups of elevation records.

Example 3—Methods for Merging Sets of Elevation Data Points

Figure 2A:
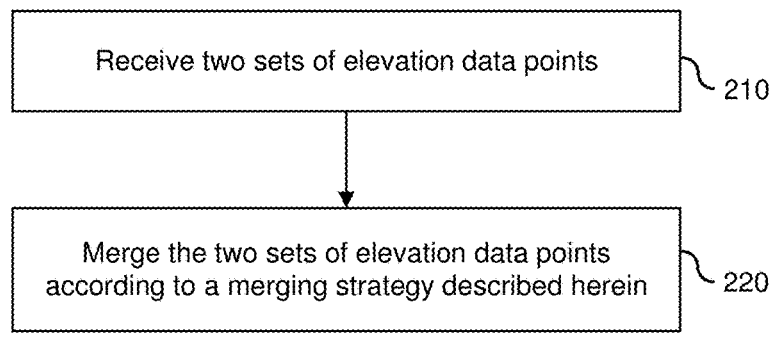
FIGS. 2A and 2B are flowcharts depicting an example method for merging sets of elevation data points.

FIG. 2A is a flowchart depicting an example method for merging sets of elevation data points. At 210, a first set of elevation data points and a second set of elevation data points are received. At least some of the elevation data points in the first set identify locations within a physical landscape and comprise elevation measurements at the identified locations in the physical landscape. At least some of the elevation data points in the second set also identify locations in the physical landscape and also comprise elevation measurements at the identified physical locations. The elevation measurements at the identified physical locations can be topographic measurements. In some embodiments, one or more portions of the physical landscape are underwater terrain. In these embodiments, elevation data points that identify locations in underwater portions of the physical landscape can comprise elevation measurements that are bathymetric measurements. An elevation data point set may have elevation data points that only contain bathymetric measurements. Elevation data points that contain bathymetric measurements, or depth measurements, may be referred to as bathymetric data points. Alternatively, an elevation data point set may have a mix of elevation data points that contain bathymetric measurements and elevation data points that contain topographical measurements. Although this example describes the merging of two sets of elevation data points, the technologies described herein can be used to merge more than two sets of elevation data points as well.

At 220, the two data sets are merged, according to a merging strategy, to create a combined set of elevation data points. A merging strategy comprises a process to merge sets of elevation data points without user input. Any of the example merging strategies described herein can be used to merge the first and second sets of elevation data points at 220. Which elevation data points are in the combined set of elevation data points depends on the merging strategy that is used and the elevation data points that are contained in the first and second sets. In some cases, the combined set of elevation data points may contain elevation data points from both the first and second set. In other cases, the combined set of elevation data points may contain elevation data points from only one of the two sets.

Figure 2B:
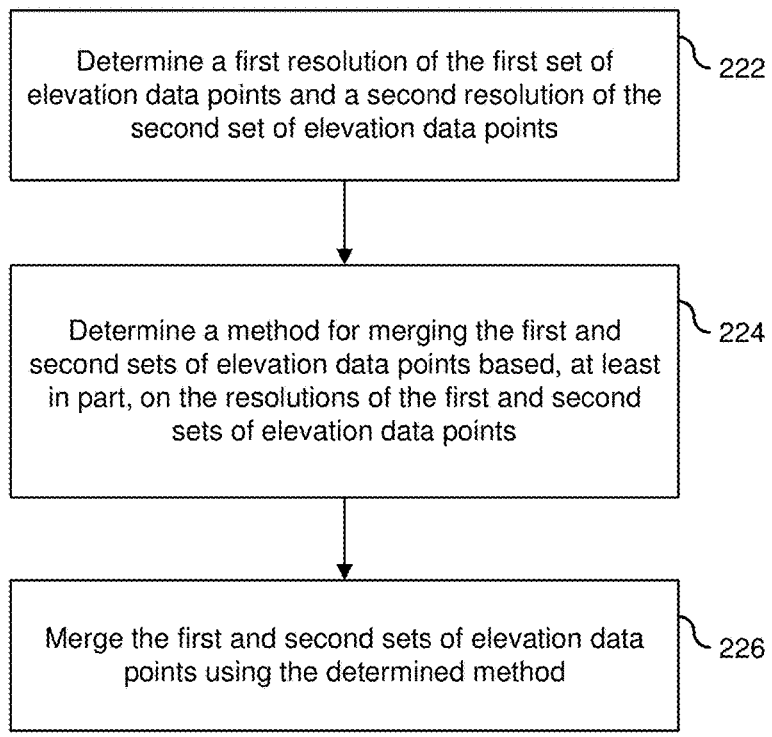

FIG. 2B is a flowchart depicting an example merging strategy for merging the first and second sets of elevation data points at 220. At 222, a first resolution is determined for the first set of elevation data points, and a second resolution is determined for the second set of resolution data points. Any of the example methods described herein for determining the resolution of a set of elevation data points can be used to determine the first and second resolutions at 222. In some embodiments, a resolution of a set of elevation data points is based on an area of the physical landscape that is covered by the locations in the physical landscape identified by the set's elevation data points.

At 224, a method for merging the first and second sets of elevation data points is determined. The determination of a merging method is based, at least in part, on the resolutions of the first and second sets of elevation data points. Any of the example methods described herein for determining a method for merging sets of elevation data points can be used to determine the method for merging the first and second sets at 224. For instance, the method for merging the sets of elevation data points can be based on the relative similarity or dissimilarity of the resolutions of the sets within the physical landscape.

At 226, the first and second sets of elevation data points are merged using the merging method determined at 224. Merging the sets of elevation data points results in the creation of a combined set of elevation data points. As described further below, the combined set of elevation data points can be used to generate an elevation model of the physical landscape.

Figure 3A:
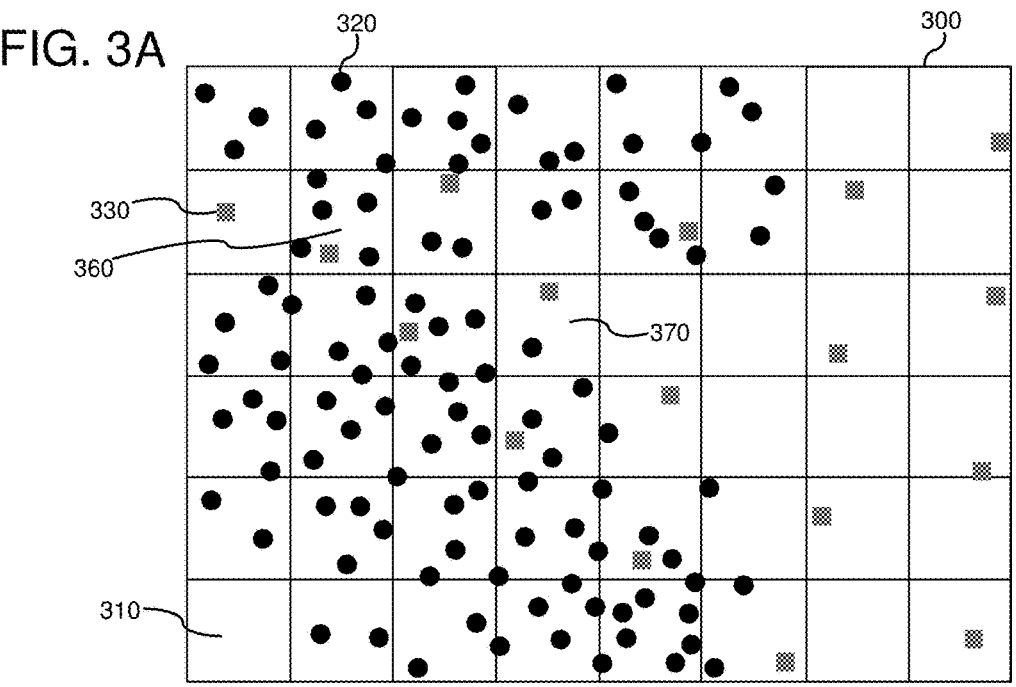
FIG. 3A is a diagram depicting example elevation data points, from two sets of elevation data points, in a representation of a physical landscape.

FIG. 3A is a diagram depicting an example representation of a physical landscape 300. Example elevation data points from two sets of elevation data points are represented by symbols positioned at the locations that they identify within the representation of the physical landscape 300. For instance, elevation data points from a first set of elevation data points are represented by black dots (e.g., 320), while elevation data points from a second set of elevation data points are represented by gray squares (e.g., 330). The representation of the physical landscape 300 is divided into a grid of cells (e.g., 310). In some embodiments, the dimensions of the grid cells are fixed, while in other embodiments they are variable. Although the example physical landscape representation 300 and the example grid cells (e.g., 310) are rectangular, other geometric shapes for the physical landscape and the cells are possible. In some embodiments, the dimensions and/or shapes of grid cells can differ based on various conditions. For instance, in a physical landscape that comprises one or more underwater areas, grid cells in representation 300 that are relatively closer to coastal regions can be smaller than grid cells in representation 300 that are relatively farther away from the coastal regions. Similarly, grid cells that are relatively closer to coastal regions can has different shapes than grid cells that are relatively farther away from the coastal regions.

Figure 3B:
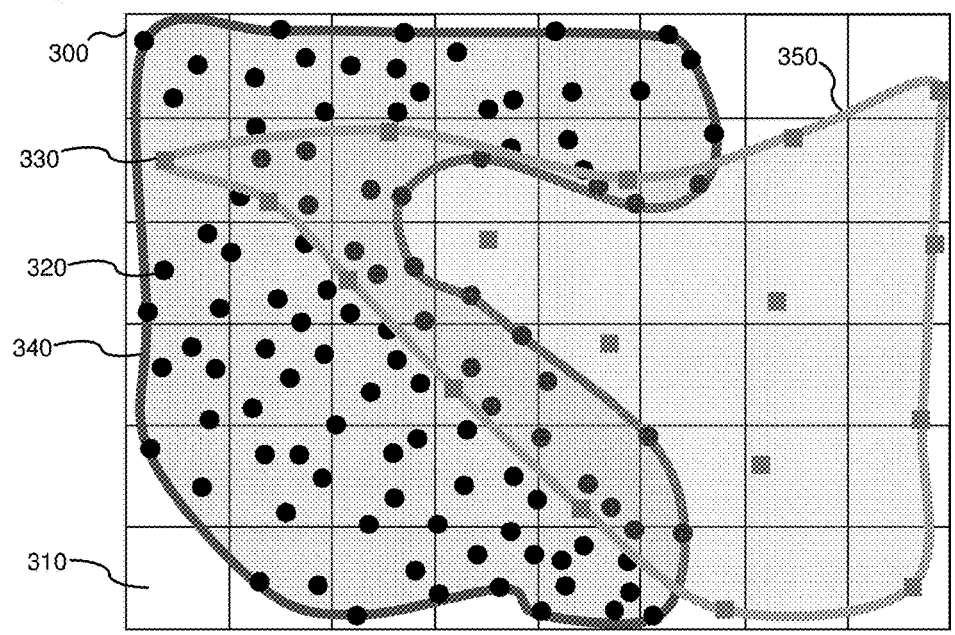
FIG. 3B is a diagram depicting example hulls, that have been generated based on elevation data points from two sets of elevation data points, in a representation of a physical landscape.

FIG. 3B is a diagram depicting example hulls (340 and 350), that have been generated for the two sets of elevation data points, within representation 300 of a physical landscape. In FIG. 3B, 340 is an example hull that contains the example elevation data points from the first set (e.g., 320), and 350 is an example hull that contains the example elevation data points from the second set (e.g., 330).

A hull for a set of elevation data points can be defined as a boundary or perimeter that encloses physical locations identified by elevation data points, belonging to the set, that identify locations within the physical landscape. Various criteria can be used to further dictate the shape of the hull. For instance, in some embodiments, a hull can be defined as a polygon that is created by connecting elevation data points in the set with lines to form a perimeter surrounding all the points in the set that identify locations within the physical landscape. The lines that connect the elevation data points can be straight or curved. Alternatively, in some embodiments, a hull can be defined as a curved shape, such as a circle or an ellipse, that encloses physical locations identified by elevation data points, belonging to the set, that identify locations within the physical landscape. Although FIGS. 3A-3B are depicted in terms of two dimensions, the systems and methods described herein can be applied to spaces with higher dimensions. For instance, elevation data points may identify physical locations where measurements were taken in terms of three dimensions. In such cases, a hull for a set of elevation data points would be a three dimensional shape, such as a polyhedron, ellipsoid, or the like.

An example method for determining a resolution of a set of elevation data points comprises generating a hull for the set of elevation data points, determining the area of the set's hull (or a volume in a scenario where the hull is three-dimensional), and determining a ratio between the number of elevation data points in the set that identify locations within the physical landscape and the area of the set's hull. In this example, the ratio between the number of elevation data points and the area of the set's hull represents the resolution of the elevation data point set. Referring to FIG. 3B, this method could be used to determine a first resolution of the first set of example elevation data points (represented by black dots, e.g., 320) and a second resolution of the second set of example elevation data points (represented by gray squares, e.g., 330). For instance, the resolution of the first set can be determined by calculating a ratio between the number of example elevation data points of the first set that identify physical locations within the physical landscape (e.g., 320) and the area of hull 340. Similarly, a resolution of the second set can be determined by calculating the ratio between the number of example elevation data points of the second set that identify locations within the physical landscape (e.g., 330) and the area of hull 350. In this example, the first set of example elevation data points has a higher resolution than the second set of example elevation data points since the first set of example elevation data points has more elevation data points covering a larger area of the physical landscape than the second set of elevation data points.

In some cases, such as in example representation 300, the hulls for two sets of elevation data points can overlap. Elevation data points from two sets whose hulls do not overlap can often be merged by combining the elevation data points from both sets that identify locations within the physical landscape into a single set of elevation data points. However, in cases where the hulls of two sets overlap, additional steps are typically needed to merge the elevation data points that identify locations within the overlapping areas. Example methods for merging elevation data points that identify physical locations in overlapping areas are described further below.

An example method for merging elevation data points that identify physical locations in areas where hulls for two sets of elevation data points overlap is to keep elevation data points from one of the sets in the overlapping areas based on a predetermined criteria. For the sake of brevity, this example method of merging elevation data point sets may be referred to as "merging by hull," or "merging on a hull basis."

In some embodiments, the predetermined criteria that is used to determine which elevation data points to keep is based on which set of elevation data points has the more reliable measurements. For instance, the predetermined criteria may be to keep elevation data points in areas where the hulls overlap that belong to the set of elevation data points with a higher density of elevation data points that identify locations in the physical landscape. In some cases, the density of a set is the number of the set's elevation data points that identify locations within the physical landscape. In some other cases, the density of a set of elevation data points is a function of the number of the set's elevation data points that identify locations within the physical landscape and the area of the set's hull. In these cases, the density of a set of elevation data points is proportional to the set's resolution. In some cases where the predetermined criteria is to keep elevation data points from the set with the higher density, elevation data points that identify physical locations in the overlapping areas that belong to the set with the lower density are removed or excluded from the combined set of elevation data points.

In some embodiments, the elevation measurements of elevation data points are associated with uncertainty values. The uncertainty values can be measures of the unreliability of the elevation measurements. The elevation data points may further comprise the uncertainty values. Alternatively, in some cases a single uncertainty value may be provided for a set of elevation data points, and thereby associated with all of the elevation data points in the set.

In embodiments where elevation data points' elevation measurements are associated with uncertainty values, the predetermined criteria can be to keep elevation data points in areas where the hulls of sets of elevation data points overlap from the set with the lower average uncertainty. In scenarios where elevation data points in a set comprise separate uncertainty values, the average uncertainty for the set can be an average uncertainty for the elevation data points in the set that identify locations in the physical landscape, or within the set's hull. In scenarios where a single uncertainty value is provided for a set of elevation data points, the provided uncertainty value can be used as the set's average uncertainty. In scenarios where elevation data points do not have uncertainty values, default uncertainty values may be provided. Default uncertainty values may be predetermined, and may be based on attributes associated with the elevation data points, such as when the measurements were taken, the method used to take the measurements, the source of the measurements, etc. In some cases, where the predetermined criteria is to keep elevation data points from the set with the lower average uncertainty, elevation data points that identify physical locations in the overlapping areas that belong to the set with the higher average uncertainty are removed or excluded from the combined set of elevation data points.

In some embodiments, the predetermined criteria is to keep elevation data points in the overlapping hull areas that belong to the set of elevation data points that has a higher ratio between its density and its average uncertainty, or density-to-average-uncertainty ratio. In some cases, where the predetermined criteria is to keep elevation data points from the set with the higher ratio between its density and its average uncertainty, elevation data points that identify physical locations in the overlapping areas that belong to the set with the lower density-to-average-uncertainty ratio are removed or excluded from the combined set of elevation data points.

The predetermined criteria may also be to keep all of the elevation data points in areas where hulls of sets of elevation data points overlap, or to not keep any elevation data points in areas where the hulls of the sets overlap.

In some embodiments, several possible criteria, such as higher density, lower uncertainty, higher density-to-uncertainty ratio, all, and none, are available and one of the available criteria is selected as the predetermined criteria before the sets of elevation data points are merged.

Figure 4:
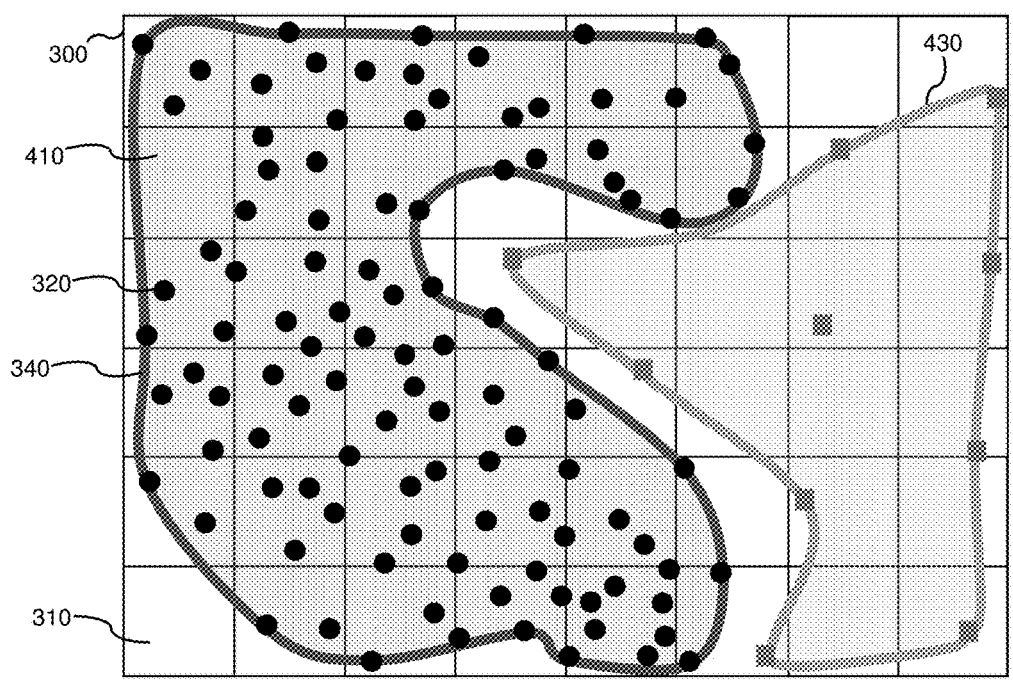
FIG. 4 is a diagram depicting an example result of merging two sets of elevation data points by hull.

FIG. 4 is a diagram depicting an example result of merging the two sets of example elevation data points by hull, in example representation 300. Referring to FIG. 3B, hull 340, for the first set of example elevation data points (e.g., 320), and hull 350, for the second set of example elevation data points, overlap. For the purposes of the example results illustrated in FIG. 4, assume that the predetermined criteria for merging the two sets of example elevation data points is to keep elevation data points in overlapping hull areas from the set with the higher density-to-average-uncertainty ratio. Assume also that the first set has a higher density-to-average-uncertainty ratio, as compared to the second set's density-to-average-uncertainty ratio. Applying the "merge by hull" method with these assumptions to the example sets of elevation data points in representation 300 yields the example results illustrated in FIG. 4. In this example, the elevation data points from the second set that identified physical locations in the overlapping area have been removed. A new hull 430 has been generated for the remaining elevation data points from the second set for illustration purposes.

In some cases, merging sets of elevation data points by hull can leave some grid cells without any elevation data points. For instance, in the example results illustrated in FIG. 4, no elevation data point identifies a location in grid cell 410. Before the two sets were merged by hull, as can be seen in FIG. 3B, elevation data point 330 from the second set of elevation data points identified a location within that cell. However, that elevation data point is no longer present after merging the sets by hull.

Another example method for merging elevation data points that identify physical locations in areas where hulls for two sets of elevation data points overlap is to overlay a grid of cells on a map or representation of the physical landscape and, within one or more cells of the grid, keep the elevation data points that identify physical locations within the cell from one of the two sets based on a predetermined criteria. For the sake of brevity, this method of merging sets of elevation data points may be referred to as "merging by grid cell," or "merging on a grid cell basis." When merging sets of elevation data points by grid cell, a cell can be "evaluated" by examining the elevation data points that identify physical locations within the cell and keeping elevation data points from one of the sets based on the predetermined criteria. In some embodiments, each cell in the grid is evaluated while, in other embodiments, only grid cells that contain physical locations identified by at least one elevation data point from more than one set are evaluated. Such grid cells may be referred to as "overlapping grid cells" for the sake of brevity. In some scenarios, it may be more efficient to evaluate only overlapping grid cells instead of every cell in the grid. Such a scenario may be when the grid has several cells and only a small number of the cells in the grid are overlapping grid cells.

Predetermined criteria similar to those discussed above with respect to merging sets of elevation data points by hull can be used when merging sets of elevation data points by grid cell. For instance, criteria that use density and/or average uncertainty for sets of elevation data points can be used, where density and/or average uncertainty are determined based on the elevation data points of the sets that identify locations within a grid cell. In this respect, determining density and average uncertainty when merging sets of elevation data points by grid cell can be similar to determining density and average uncertainty when merging by hull, with the difference being the area of the physical landscape that is considered. For instance, when merging sets of elevation data points by hull, the area of the physical landscape being considered is the entire physical landscape or the areas of the sets' hulls, whereas, when merging sets by grid cell, the area being considered is the area of a grid cell that is being evaluated.

In some embodiments, when evaluating a grid cell, the predetermined criteria can be to keep elevation data points that identify locations within the cell that belong to the set with the higher density within the cell. Density of a set of elevation data points within a cell can be defined as a function of the number of the set's elevation data points that identify locations within the cell and the area of the cell. In embodiments where the grid cells are of a uniform size, density of a set of elevation data points within a cell can be the number of the set's elevation data points that identify locations within the cell. In some implementations, elevation data points that identify locations within the cell, but belong to sets with lower densities within the cell, are removed or excluded from the combined set of elevation data points.

In some embodiments, when evaluating a grid cell, the predetermined criteria can be to keep elevation data points that identify locations within the cell that belong to the set of elevation data points with a lower average uncertainty within the cell. In scenarios where elevation data points comprise separate uncertainty values, the average uncertainty value of a set within a cell can be an average of the uncertainty values of the set's elevation data points that identify physical locations within the cell. In scenarios where a single uncertainty value is provided for a set of elevation data points, the provided uncertainty value can be the average uncertainty value of the set within the cell. In scenarios where elevation data points do not have uncertainty values, default uncertainty value may be provided. Default uncertainty value may be predetermined, and may be based on attributes associated with the elevation data points, such as when the measurements were taken, the method used to take the measurements, the source of the measurements, etc. In some implementations, where the predetermined criteria is to keep elevation data points within the cell from the set with the lower average uncertainty within the cell, elevation data points that identify locations within the cell, but belong to sets with higher average uncertainties within the cell, are removed or excluded from the combined set of elevation data points.

In some embodiments, when evaluating a grid cell, the predetermined criteria can be to keep elevation data points that identify locations within the cell from the set of elevation data points that has a higher ratio between its density within the cell and its average uncertainty within the cell, or a higher density-to-average-uncertainty ratio within the cell. In some implementations, where the predetermined criteria is to keep elevation data points within the cell from the set with the higher density-to-average-uncertainty ratio within the cell, elevation data points that identify locations within the cell, but belong to sets with lower density-to-average uncertainty ratios within the cell, are removed or excluded from the combined set of elevation data points.

The predetermined criteria may also be to keep all of the elevation data points within overlapping grid cells, or to not keep any elevation data points within overlapping grid cells.

In some embodiments, several possible criteria, such as higher density within overlapping grid cells, lower uncertainty within overlapping grid cells, higher density-to-average-uncertainty ratio within overlapping grid cells, all within overlapping grid cells, and none within overlapping grid cells, are available and one of the available criteria is selected as the predetermined criteria before the sets of elevation data points are merged.

Figure 5:
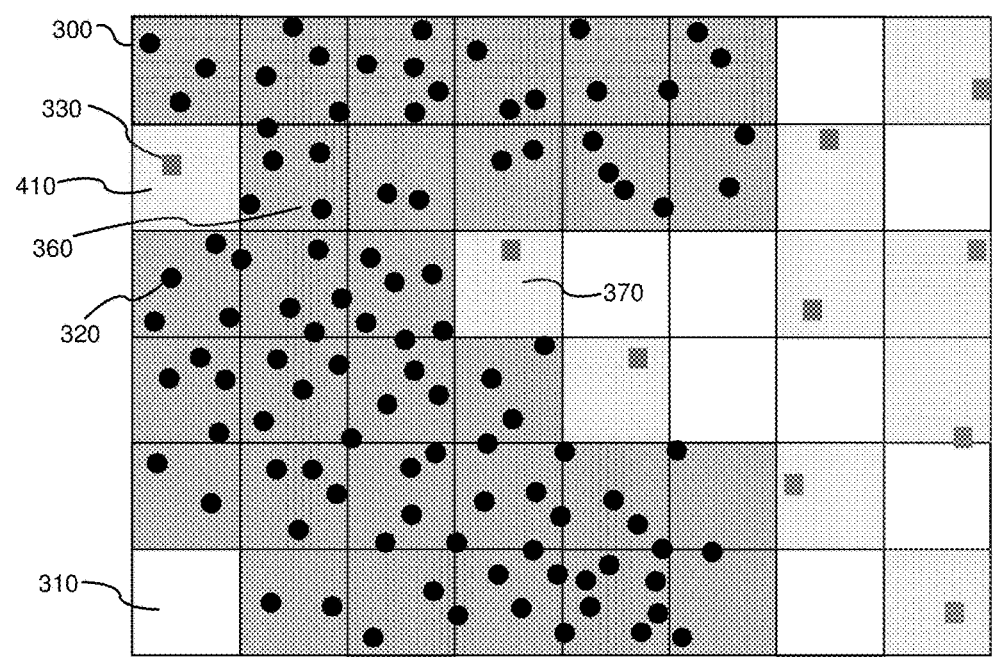
FIG. 5 is a diagram depicting an example result of merging two sets of elevation data points by grid cell.

FIG. 5 is a diagram depicting an example result of merging the two sets of example elevation data points by grid cell, in example representation 300. Referring to FIG. 3A, a first set of example elevation data points (e.g., 320)

and a second set of elevation data points (e.g., 330) are represented by symbols positioned at the locations that they identify within the representation of the physical landscape 300. Representation 300 of the physical landscape has been divided into a grid of cells (e.g., 310). For the purposes of the example results illustrated in FIG. 5, assume that, when evaluating a grid cell, the predetermined criteria is to keep elevation data points that identify locations within the cell that belong to the set of elevation data points that has the higher density-to-average-uncertainty ratio within the cell. Also assume that each example elevation data point in the first set has an uncertainty value of five (5) and that each example elevation data point in the second set has an uncertainty value of four (4). Applying the "merge by grid cell" method with these assumptions to the example sets of elevation data points in representation 300 yields the example results illustrated in FIG. 5. In this example, only the elevation data points that identify locations within a cell that belong to the set with a higher density-to-average-uncertainty ratio within a cell are kept in the cell.

For instance, FIG. 3A, grid cell 360 contains five (5) example elevation data points from the first set and one (1) example elevation data point from the second set. In this example, the first set's density-to-average-uncertainty ratio within grid cell 360 is 5:5, or a density of five (5) elevation data points that identify locations within cell 360 to an average uncertainty value of five (5) within grid cell 360, per the assumptions stated above. Whereas, the second set's density-to-average-uncertainty ratio within grid cell 360 is 1:4, or a density of one (1) elevation data point that identifies a location within cell 360 to an average uncertainty value of four (4) within cell 360, per the assumptions stated above. Since the first set of example elevation data points has the higher density-to-average-uncertainty ratio within grid cell 360, the five (5) elevation data points that identify locations within cell 360 are kept. This can be seen in FIG. 5, where the five elevation data points from the first set are still present in cell 360, but the elevation data point from the second set is no longer present in the cell.

Referring to grid cell 370, in FIG. 3A, the cell contains one (1) elevation data point from the first set and one (1) elevation data point from the second set. In this case, the elevation data point form the second set will be kept since the second set's density-to-average-uncertainty ratio within gird cell 370 (1:4) is higher than the first set's density-to-average-uncertainty ratio within cell 370 (1:5). This can be seen in FIG. 5, where the elevation data point from the second set of example elevation data points is still present in cell 370, but the elevation data point from the first set of example elevation data points is no longer present in the cell.

Also, in this example, after merging the first and second sets of example elevation data points, elevation data point 330 from the second set is still present in grid cell 410, whereas this elevation data point was removed when the sets were merged by hull in the previous example.

FIGS. 4 and 5 illustrate that, in some cases, merging sets of elevation data points by hull and by grid cell can result in different combined sets of elevation data points. FIGS. 6A-F illustrate that, in some cases, the combined set of elevation data points obtained by merging sets of elevation data points by hull is preferred to the combined set of elevation data points obtained by merging sets of elevation data points by grid cell; while in other cases the combined set of elevation data points obtained by merging sets of elevation data points by grid cell is preferred to the combined set of elevation data points obtained by merging sets of elevation data points by hull.

FIG. 6A is a diagram depicting example elevation data points, from two sets of elevation data points, in a cross-section of a representation of a physical landscape 610. The physical landscape 610 is divided into grid cells (e.g., 620) by sixteen (16) vertical lines (e.g., 616) (the grid cells appear as columns in this example since diagrams 6A-F are cross-sections). Example elevation data points, from the first set of elevation data points, that identify locations within the physical landscape are represented by black dots (e.g., 630). Example elevation data points, from the second set of elevation data points, that identify locations within the physical landscape are represented by gray dots (e.g., 640). In this example, the elevation data points are represented in the cross-section horizontally based on the locations that the elevation data points identify within the physical landscape, and vertically based on the elevation measurements of the elevation data points.

FIG. 6B is a diagram depicting example results of merging the first and second sets of elevation data points by grid cell. In this scenario, an example elevation data point from the second set of elevation data points is still present in grid cell 620 after the first and second sets are merged. Dashed line 612 represents an elevation model generated for physical landscape 610 based on the example elevation data points that remain after merging the sets by grid cell.

FIG. 6C is a diagram depicting example results of merging the first and second sets of elevation data points by hull. In this scenario, the second set's example elevation data point in grid cell 620 has been removed, even though it was the only elevation data point from either set that contained an elevation measurement at a location within cell 620. The elevation data point is removed from cell 620 in this example because the elevation data point identifies a location in an area where the hulls of the first and second sets overlap and the elevation data points that identify locations in the overlapping areas from the first set are kept in the overlapping areas based on the predetermined criteria. Dashed line 614 represents an elevation model generated for physical landscape 610 based on the example elevation data points that remain after merging the first and second sets by hull.

In the example illustrated in FIGS. 6A-C, the elevation model 612, that is based on the elevation data points that remained after merging the sets of example data points by grid cell, is a more accurate model of physical landscape 610 than the elevation model 614, that is based on the elevation data points that remained after merging the first and second sets by hull.

FIG. 6D is a diagram depicting example elevation data points from two other sets of elevation data points in a cross-section of a representation of another physical landscape 650. The physical landscape 650 is divided into grid cells (e.g., 660) by sixteen (16) vertical lines (e.g., 656). Example elevation data points, from the first set of elevation data points, that identify locations within the physical landscape are represented by black dots (e.g., 670). In this example, only one (1) example elevation data point from the second set (680) identified a location within the physical landscape. Similar to the previous example, the elevation data points in this example are represented in the cross-section horizontally based on the locations that the elevation data points identify within the physical landscape, and vertically based on the elevation measurements of the elevation data points.

FIG. 6E is a diagram depicting example results of merging the first and second sets of example elevation data points by grid cell. In this scenario, the second set's elevation data point 680 is still present in grid cell 660 after the first and second sets are merged. Dashed line 652 represents an example elevation model generated for physical landscape 650 based on the example elevation data points that remain after merging the sets by grid.

FIG. 6F is a diagram depicting example results of merging the first and second sets of elevation data points by hull. In this scenario, the second set's example elevation data point 680 is removed from cell 660 because example elevation data point 680 identifies a location in an area where the hulls of the first and second sets overlap and the elevation data points that identify locations in the overlapping areas from the first set are kept in the overlapping areas based on the predetermined criteria. Dashed line 654 represents an elevation model generated for physical landscape 650 based on the example elevation data points that remain after merging the first and second sets by hull.

In the example illustrated in FIGS. 6D-F, the elevation model 654, that is based on the elevation data points that remained after merging the sets of example data points by hull, is a more accurate model of physical landscape 650 than the elevation model 652, that is based on the elevation data points that remained after merging the first and second sets by grid cell.

In some cases, there is a relationship between the relative similarity of the resolutions of two sets of elevation data points and the method of merging the sets that will result in a more accurate elevation model. Two such cases are illustrated in FIGS. 6A-F.

For instance, in FIG. 6A, the first and second sets of example elevation data points in the cross-section of physical landscape 610 have resolutions that are relatively similar: the first set of example elevation data points has twelve (12) elevation data points that identify locations within the physical landscape 610 and the second set of example elevation data points has nine (9) elevation data points that identify locations within the physical landscape 610. In this scenario, merging the first and second sets of example elevation data points by grid results in a more accurate elevation model 612 of the physical landscape 610 than the elevation model 614 that results from merging the sets by hull.

By contrast, in FIG. 6D, the first and second sets of example elevation data points in the cross-section of physical landscape 650 have resolutions that are relatively dissimilar: the first set of example elevation data points has fourteen (14) elevation data points that identify locations within physical landscape 650 and the second set of example elevation data points has one (1) elevation data point that identifies a location within physical landscape 650. In this scenario, merging the first and second sets of elevation data points by hull results in a more accurate elevation model 654 of physical landscape 650 than elevation model 652 that results from merging the sets by grid cell.

In some embodiments, a determination of whether resolutions of two sets of elevation data points are relatively similar is based on a ratio between the resolutions of the two sets. For instance, referring to FIG. 6A, a ratio between the resolutions of the first and second sets of example elevation data points can be 4:3, or twelve (12) elevation data points of the first set that identify locations within physical landscape 610 to nine (9) elevation data points of the second set that identify locations within physical landscape 610. Referring to FIG. 6D, a ratio between the first and second sets of example elevation data points can be 14:1, or fourteen (14) elevation data points of the first set that identify locations within physical landscape 650 to one (1) elevation data point of the second set that identifies a location within physical landscape 650.

Figure 7:
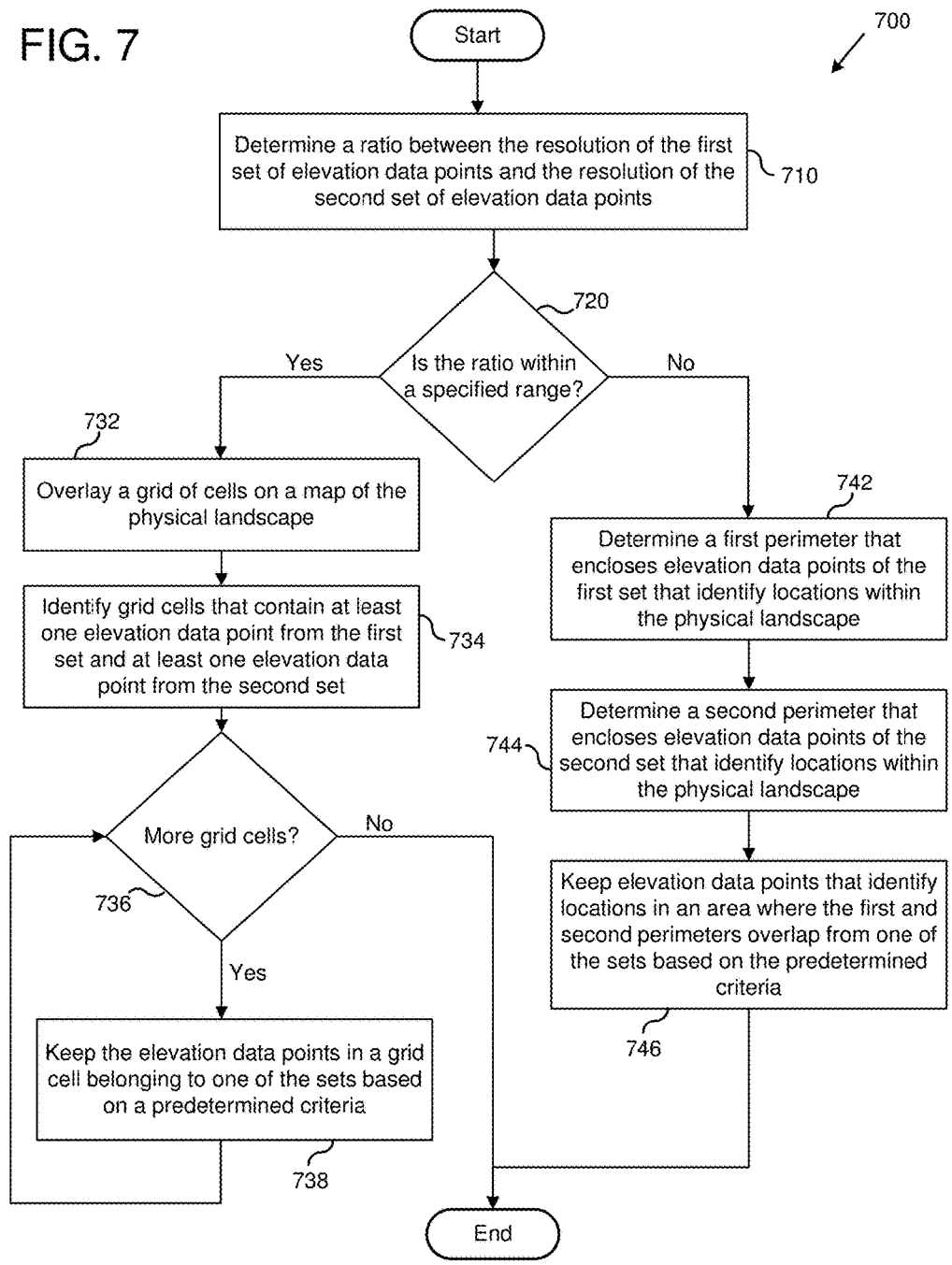
FIG. 7 is a flowchart depicting an example process for determining a method for merging two sets of elevation data points and merging the two sets of elevation data points using the determined method.

FIG. 7 is a flowchart depicting an example process 700 for determining a method for merging two sets of elevation data points based, at least in part, on the resolutions of the sets of elevation data points, and merging the sets of elevation data points using the determined method.

At 710, a ratio is determined between the resolutions of the two sets of elevation data points. At 720, the ratio between the resolutions of the two sets of elevation data points is evaluated to determine whether or not the ratio is within a specified range. In some embodiments, the specified range is specified as:

$$\frac{1}{ST} \le \frac{R_1}{R_2} \le ST,$$

wherein ST is a similarity threshold, $R_1$ is a resolution of a first set of elevation data points, and $R_2$ is a resolution of a second set of elevation data points. If $R_1/R_2$ is less than or equal to ST and greater than or equal to one (1) divided by ST, then the ratio between $R_1$ and $R_2$ is within the specified range. Otherwise, the ratio is not within the specified range. In further or different embodiments, the ratio between the resolutions of two sets of elevation data points is determined to not be within the specified range when ST is equal to zero (0). In still further or different embodiments, the ratio is determined to be within the specified range when ST is greater than the absolute value of $R_1$ minus $R_2$:

$$ST > |R_1 - R_2|$$

In some embodiments, a default value is provided for the similarity threshold. The similarity threshold may also be adjustable. For instance, the similarity threshold may have a default value of three (3), but the similarity threshold may be set to another integer. Similarity thresholds that are rational numbers are also possible.

These expressions are provided as examples of specified ranges. Other ways of expressing a specified range are also possible.

If the ratio between the resolutions of the two sets of elevation data points are within the specified range, then the resolutions are determined to be relatively similar or compatible and, at 732-738, the two sets of elevation data points are merged by grid cell. Otherwise, if the ratio is not within the specified range, then the resolutions are determined to not be relatively similar or compatible and, at 742-746, the two sets of elevation data points are merged by hull.

At 732, a grid of cells is overlaid on a map of the physical landscape. At 734, grid cells that contain at least one elevation data point from each of the two sets are identified. At 736 and 738, the grid cells identified at 734 are evaluated. Each grid cell, of the grid cells that were identified at 734, is evaluated and elevation data points in the grid cell that belong to one of the two sets are kept based on a predetermined criteria. In some embodiments, elevation data points in grid cells that only contain elevation data points from one set are kept. Any other example method described herein for merging sets of elevation data points by grid cell could also be used.

At 742, a perimeter is determined that encloses elevation data points of one of the two sets that identify physical locations within the physical landscape. At 744, another perimeter is determined that encloses elevation data points of the other set that identify locations within the physical landscape. In some embodiments, the perimeters determined at 742 and 744 are hulls for the two sets of elevation data points. At 746, elevation data points that identify locations in an area of the physical landscape where the perimeters overlap are identified. Of the identified elevation data points, those belonging to one of the two sets of elevation data points are kept based on a predetermined criteria. The predetermined criteria used at 746 may be the same predetermined criteria used at 738. In some embodiments, elevation data points from both sets that identify locations in the physical landscape that are not within an area where the perimeters overlap are kept. Any other example method described herein for merging sets of elevation data points by hull could also be used.

Example 4—Methods for Generating Elevation Models

Figure 8:
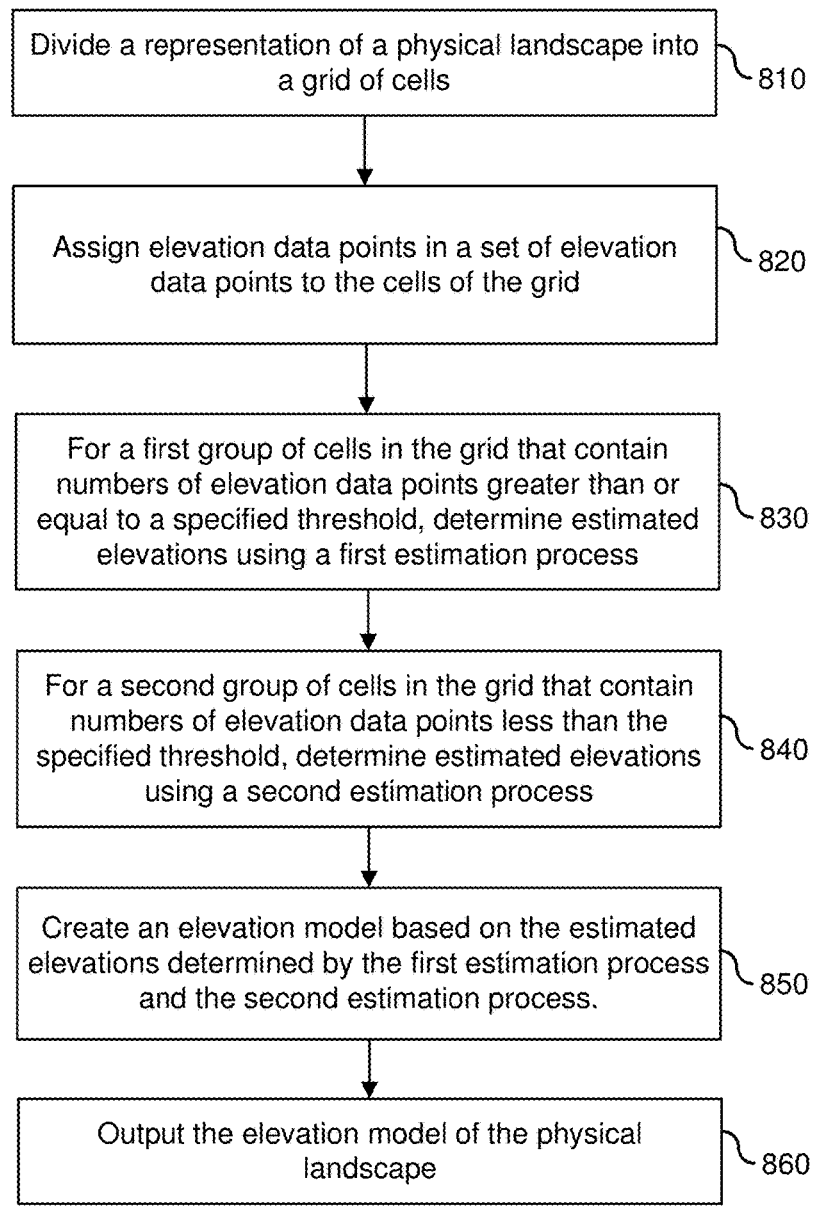
FIG. 8 is a flowchart depicting an example method for generating an elevation model of a physical landscape based on a combined set of elevation data points.

FIG. 8 is a flowchart depicting an example method for generating an elevation model of a physical landscape based on a combined set of elevation data points.

At 810, a representation of the physical landscape is divided into a grid of cells. At 820, elevation data points belonging to the combined set of elevation data points are assigned to the cells of the grid, such that an elevation data point that identifies a location within the physical landscape is assigned to the cell that contains the location. For instance, in an embodiment where the grid is two-dimensional and the cells are defined by four (4) sets of coordinates, an elevation data point comprising coordinates (X,Y) can be assigned to a grid cell comprising coordinates [W,N; E,N; W,S; E,S] if X is between W and E, and Y is between N and S. In such a case, the elevation data point comprising coordinates (X,Y) will be assigned to the grid cell comprising coordinates [W,N; E,N; W,S; E,S].

At 830, a first group of cells is identified that each contain a number of elevation data points that is greater than or equal to a specified threshold. In at least one embodiment, the specified threshold is set to a value of five (5) elevation data points, but other values are also possible. For the sake of brevity, a cell that contains a number of elevation data points greater than or equal to the specified threshold may be referred to as a cell with a "high density" of elevation data points or a "high density cell." For each grid cell in the first group, an estimated elevation is determined based, at least in part, on the elevation measurements of the elevation data points contained within the cell, using a first estimation process for determining elevation estimates based on a number of data points greater than or equal to the specified threshold. Some processes for estimating elevations are designed for, or particularly effective at, estimating elevations for high density cells. For example, the Combined Uncertainty and Bathymetry Estimator (CUBE) described in Calder, *Automatic Statistical Processing of Multibeam Echosounder Data,* 4 Int'l Hydrographic Rev. 53 (2003), is effective at processing high density cells when the elevation measurements of the elevation data points are bathymetric measurements. It is possible to use such a process as the first estimation process at 830. When the elevation measurements are bathymetric measurements, the elevation estimation process may be referred to as a depth estimation process and the estimated elevations may be referred to as estimated depths.

At 840, a second group of cells in the grid is identified, wherein each cell in the second group contains a number of elevation data points that is less than the specified threshold. For the sake of brevity, a grid cell that contains a number of elevation data points less than the specified threshold may be referred to as a cell that contains a "low density" of elevation data points or a "low density cell." An estimated elevation is determined for each cell in the second group based, at least in part, on the elevation measurements of the elevation data points contained within the cell using a second estimation process. Some processes that are designed for, or particularly effective at, estimating elevations for high density cells are less effective at estimating elevations for low density cells, or will not provide estimates for low density cells. For instance, the CUBE process discussed above will not generate elevation estimates for low density grid cells. At 840, the second estimation process can be a process that is effective at estimating elevations for low density cells and/or interpolating elevation estimations for low density cells or cells that do not contain any elevation data points.

An example process for elevation estimation that can generate elevation estimations for low density grid cells is the Three Step Approach (3Step), described in Elmore et al., *Algorithm Design Study for Bathymetric Fusion-Review of Current State-of-the-art and Recommended Design Approach,* NRL/FR/7440-08-10,162 (2008). It is possible to use the 3Step approach as the second estimation process at 840. It is also possible to modify the 3Step approach in certain situations. For instance, in scenarios where elevation data points in the combined set of elevation data points are already associated with uncertainty values, the uncertainty estimation described in Elmore can be removed. Also, the ordinary kriging described in Elmore is subject to aliasing. An optional anti-aliasing filter can be utilized to reduce distortion caused by this aliasing. It is also possible to use a modified three step approach comprising one or more of these modifications as the second estimation process at 840.

At 850, an elevation model is created that is based, at least in part, on the estimated elevations determined by the first estimation process and the second estimation process for the first and second groups of grid cells. In some embodiments, the elevation model comprises the grid of cells with the cells that were in the first and second groups associated with their respective estimated elevations. The elevation model can comprise a representation of the physical landscape overlaid with the grid of cells, with estimated elevations indicated within the cells. The elevation model can comprise a topographic and/or bathymetric map of the physical landscape generated based on the estimated elevations associated with the cells. The elevation model could instead, or additionally, comprise one or more cross-sections of the physical landscape comprising contour lines of features of the landscape that are interpolated based on the estimated elevations of the cells. The elevation model can also, or instead, comprise a three dimensional representation of the physical landscape generated based on the estimated elevations associated with the cells. At 860, the elevation model of the physical landscape is output.

FIGS. 9A-E are diagrams depicting stages in another example method for generating an elevation model of a physical landscape using a merged set of elevation data points. FIG. 9A depicts a representation of a physical landscape 900 overlaid with a grid of cells 902. Although this example references the representation of the physical landscape 900 separately from the grid of cells 902, in some embodiments the grid of cells can be generated as the representation of the physical landscape. Elevation data points (e.g., 910) from the merged set of elevation data points are assigned to the cells of grid 902. Some of the cells in grid 902 contain a number of elevation data points greater than or equal to a specified threshold (e.g., grid cell 904) and some of the cells in grid 902 contain a number of elevation data points less than the specified threshold (e.g., grid cell 906), or no elevation data points at all. As discussed above, the terms "high density cell" and "low density cell" may be used to refer to cells with a number of elevation data points greater than or equal to the specified threshold, and less than the specified threshold, respectively.

A first process for estimating elevations for high density cells is used to generate estimated elevations for the cells in grid 902 that qualify as high density cells (e.g., 904). The first elevation estimation process also generates estimated uncertainty values for the cells associated with the estimated elevations. An estimated uncertainty value generated for a cell can indicate a level of confidence associated with the estimated elevation generated for the cell. In cases where the elevation data points are associated with uncertainty values, the estimated uncertainty values are based, at least in part, on these uncertainty values. In cases where some of the elevation data points are not associated with uncertainty values, estimated uncertainty values can be generated for the elevation data points prior to the application of the first elevation estimation process. For instance, a Monte Carlo method can be used to generate estimated uncertainty values for the elevation data points when the combined set of elevation data points contains a sufficient number of elevation data points. Other estimation techniques are also possible. In cases where uncertainty values are estimated for elevation data points, these estimated uncertainty values are used, at least in part, as the basis for the estimated uncertainty values associated with the cells generated by the first elevation estimation process. The CUBE process, described above, can be used as the first elevation estimation process when the elevation data points comprise bathymetric measurements.

FIG. 9B depicts estimated elevations and uncertainty values generated by the first elevation estimation process (e.g., 920) assigned to the cells of grid 902. The dark inner circles represent the estimated elevations generated for the high density cells and the lighter outer circles represent the estimated uncertainty values associated with the estimated elevations. In this example, the first elevation estimation process generated estimated elevations and uncertainty values for high density cells (e.g., 904) but did not generate estimated elevations or estimated uncertainty values for low density cells (e.g., 906).

In FIG. 9C, grid 902 is modified by combining the elevation estimates and estimated uncertainty values generated by the first estimation process (e.g., 920) with the merged set of elevation data points (e.g., 910). The grid cells for which elevations and uncertainty values were estimated by the first estimation process (e.g., 904) now contain estimated elevations and estimated uncertainty values instead of elevation data points from the merged set. In some embodiments, the elevation data points from the merged set are removed from the grid cells for which estimates were generated by the first process. The estimated elevation and uncertainty value for a grid cell is then represented by creating an elevation data point within the cell that identifies a location at the middle of the cell, and comprises an elevation measurement that is the estimated elevation and an uncertainty value that is the estimated uncertainty value. Grid cells for which elevations and uncertainty values were not estimated by the first process (e.g., 906) contain the elevation data points belonging to the merged set that they previously contained, as illustrated in FIG. 9A.

A second elevation estimation process generates estimated elevations and uncertainty values for the cells in grid 902 based, at least in part, on the combined elevation and uncertainty value estimates generated by the first process and the merged set of elevation data points. In this example, as illustrated in FIG. 9D, the second elevation estimation process has generated estimated elevations and uncertainty values (e.g., 930) for the cells in grid 902, including those cells which contained elevation and uncertainty estimates generated by the first elevation estimation process, such as cell 904. In this example, the second elevation estimation process has also generated elevation and uncertainty estimates for cells that did not contain elevation data points. Referring to 930, the light inner circle represents the estimated elevation generated by the second process for the cell, and the darker outer circle represents the estimated uncertainty value generated for the cell by the second process. The 3Step and "modified three step" processes described above can each be used as the second elevation estimation process.

In some scenarios, a cell that contained an elevation estimate generated by the first process will have the same elevation estimate and/or estimated uncertainty value after application of the second process. In other cases, the second process will generate another estimated elevation and/or estimated uncertainty value for the cell. In such cases, the estimates generated by the first process may be more reliable if the first process was designed for, or more effective at, estimating elevations and/or uncertainty values for high density cells. To account for such cases, the estimates generated by the first process can be combined with the estimates generated by the second process, as illustrated in FIG. 9E. In FIG. 9E, cells for which estimates were generated by the first process (e.g., 904) contain those estimates (e.g., 920), while cells for which estimates were not generated by the first process (e.g., 906) contain the estimates generated by the second process (e.g., 930).

An elevation model for the physical landscape can comprise the grid of cells 902 with the estimated elevations and uncertainty values associated with the cells in the grid, as illustrated in FIG. 9E. The elevation model can also comprise a topographical and/or bathymetric map of the physical landscape generated based on the estimated elevations and uncertainty values. The elevation model can also comprise one or more two or three dimensional surfaces generated based on the estimated elevations and uncertainty values.

In some embodiments, a confidence model, based on the uncertainty values estimated for the cells by the first and second processes is also generated. In such embodiments, the cells in the grid that are associated with estimated elevations are also associated with uncertainty values. The confidence model can indicate a level of confidence associated with various aspects of the elevation model, such as the elevation model's elevation estimates and/or surfaces generated based on the elevation model's elevation estimates.

When the elevation data points comprise bathymetric measurements, processes for estimating depth can be used as the first and second elevation estimation processes in the example methods for generating elevation models described herein. In such scenarios, the elevation model that is generated for an underwater physical landscape can be referred to as a bathymetric model.

Although the examples discussed above describe the merging of sets of elevation data points and/or groups of elevation records, and generating elevation models, the methods and systems described herein can be extended to merge data sets and generate models of other types. For instance, sets of data points that comprise measurements at physical locations other than elevation measurements can be merged using the techniques described herein. Examples of other measurements at physical locations include sediment thickness, water current speed, wind speed, core sample properties, animal populations, temperature, etc. Also, the methods and systems described herein can be extended to support data with additional dimensionality. For instance, measurements at physical locations over a period of time can be merged. As another example, measurements at multiple depths at multiple physical locations can be merged as well. Generating models based on sets of data points with additional dimensionality may require the use of modified modelling processes. For instance, in estimation and modelling processes that utilize kriging, cokriging may be used instead of simple kriging or ordinary kriging to generate estimates and models with higher dimensionality.

Example 5—Computing Systems

Figure 10:
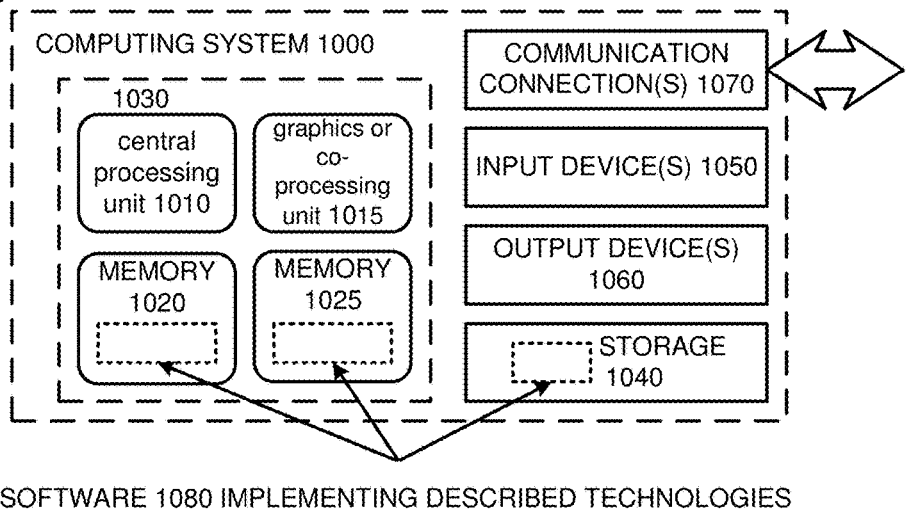
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. For video encoding, the input device(s) 1050 may be a camera, video card, TV tuner card, or similar device that accepts video input in analog or digital form, or a CD-ROM or CD-RW that reads video samples into the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 6—Cloud Computing Environment

Figure 11:
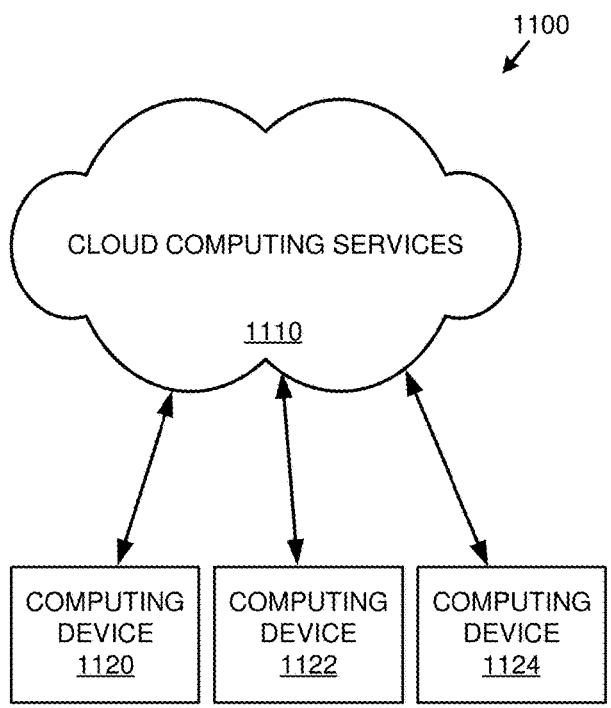
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 7—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, Python, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. One or more computer-readable media storing computer-executable instructions for causing one or more processors, when programmed thereby, to perform operations comprising:

receiving a first set of elevation data points and a second set of elevation data points, wherein at least some elevation data points in the first set of elevation data points identify locations in a physical landscape and comprise elevation measurements at the identified locations in the physical landscape, and at least some elevation data points in the second set of elevation data points identify other locations in the physical landscape and comprise elevation measurements at the other identified locations in the physical landscape; and merging the first and second sets of elevation data points to create a combined set of elevation data points according to a merging strategy, the merging strategy comprising:

determining a first resolution of the first set of elevation data points and a second resolution of the second set of elevation data points, determining a method for merging the first and second sets of elevation data points based, at least in part, on the resolutions of the first and second sets of elevation data points, wherein the determining comprises:

determining a ratio between the first resolution and the second resolution;

determining that the ratio between the first resolution and the second resolution is within a specified range; and selecting a method of merging that comprises overlaying a grid of cells on a map of the physical landscape and, in at least one grid cell that contains at least one elevation data point from each of the two sets, keeping the elevation data points in the grid cell belonging to one of the sets based on a predetermined criteria, and merging the first and second sets of elevation data points using the determined method.

2. The one or more computer-readable media of claim 1, wherein determining that the ratio between the first resolution and the second resolution is within the specified range comprises:

determining that the ratio between the first resolution and the second resolution is less than or equal to a similarity threshold value and the ratio is greater than or equal to one divided by the similarity threshold value.

3. The one or more computer-readable media of claim 2, wherein determining that the ratio between the first resolution and the second resolution is within the specified range further comprises:
    determining that the ratio is within the specified range if the similarity threshold is greater than a difference between the first and second resolutions.

4. The one or more computer-readable media of claim 1, wherein the predetermined criteria comprises:
    keeping the elevation data points in a grid cell from the set of elevation data points that has a larger density to average uncertainty ratio within the grid cell.

5. The one or more computer-readable media of claim 1, wherein determining a resolution of a set of elevation data points comprises:
    determining a number of elevation data points in the set that identify locations within the physical landscape;
    determining a perimeter that encloses the elevation data points in the set that identify locations within the physical landscape, and determining an area of the perimeter; and
    determining a ratio between the number of elevation data points in the set that identify locations within the physical landscape and the area of the perimeter.

6. The one or more computer-readable media of claim 1, wherein:
    one or more portions of the physical landscape are underwater; and
    one or more elevation data points in the first and second sets identify locations in one or more of the underwater portions of the physical landscape.

7. The one or more computer-readable media of claim 1, further comprising:
    generating an elevation model of the physical landscape based on the combined set of elevation data points; and
    outputting the generated elevation model of the physical landscape.

8. One or more computer-readable media storing computer-executable instructions for causing one or more processors, when programmed thereby, to perform operations comprising:
    receiving a first set of elevation data points and a second set of elevation data points, wherein at least some elevation data points in the first set of elevation data points identify locations in a physical landscape and comprise elevation measurements at the identified locations in the physical landscape, and at least some elevation data points in the second set of elevation data points identify other locations in the physical landscape and comprise elevation measurements at the other identified locations in the physical landscape; and
    merging the first and second sets of elevation data points to create a combined set of elevation data points according to a merging strategy, the merging strategy comprising:
        determining a first resolution of the first set of elevation data points and a second resolution of the second set of elevation data points,
        determining a method for merging the first and second sets of elevation data points based, at least in part, on the resolutions of the first and second sets of elevation data points, wherein the determining comprises:
            determining a ratio between the first resolution and the second resolution;
            determining that the ratio between the first resolution and the second resolution is not within the specified range; and
            selecting a method of merging that comprises determining a first perimeter that encloses elevation data points of the first set that identify locations within the physical landscape and a second perimeter that encloses elevation data points of the second set that identify locations within the physical landscape and, keeping elevation data points in an area where the first and second perimeters overlap from one of the sets based on a predetermined criteria, and
        merging the first and second sets of elevation data points using the determined method.

9. The one or more computer-readable media of claim 8, wherein:
    determining the first perimeter comprises creating a first polygon by connecting elevation data points of the first set with lines to form a boundary that encloses elevation data points of the first set that identify locations within the physical landscape; and
    determining the second perimeter comprises creating a second polygon by connecting elevation data points of the second set with lines to form a boundary that encloses elevation data points of the second set that identify locations within the physical landscape.

10. The one or more computer-readable media of claim 8, wherein the predetermined criteria comprises:
    keeping the elevation data points in the overlapping area from the set of elevation data points that has a larger density to average uncertainty ratio within the set's respective perimeter.

11. One or more computer-readable storing computer-executable instructions for causing one or more processors, when programmed thereby, to perform operations comprising:
    receiving a first set of elevation data points and a second set of elevation data points, wherein at least some elevation data points in the first set of elevation data points identify locations in a physical landscape and comprise elevation measurements at the identified locations in the physical landscape, and at least some elevation data points in the second set of elevation data points identify other locations in the physical landscape and comprise elevation measurements at the other identified locations in the physical landscape;
    merging the first and second sets of elevation data points to create a combined set of elevation data points according to a merging strategy, the merging strategy comprising:
        determining a first resolution of the first set of elevation data points and a second resolution of the second set of elevation data points,
        determining a method for merging the first and second sets of elevation data points based, at least in part, on the resolutions of the first and second sets of elevation data points, and
        merging the first and second sets of elevation data points using the determined method;
    generating an elevation model of the physical landscape based on the combined set of elevation data points, wherein the generating comprises:
        dividing a representation of the physical landscape into a grid of cells, assigning elevation data points in the combined set of elevation data points to the cells of the grid, such that elevation data points that identify locations within the physical landscape are assigned to grid cells that contain those locations, for a first group of cells in the grid, wherein each cell in the first group contains a number of elevation data points that is greater than or equal to a specified threshold, determining estimated elevations for the cells of the first group based, at least in part, on the elevation measurements of the elevation data points contained within the respective cells, using a first estimation process for determining elevation estimates based on a number of data points greater than or equal to the specified threshold, for a second group of cells in the grid, wherein each cell in the second group contains a number of elevation data points that is less than the specified threshold, determining estimated elevations for the cells in the second group based, at least in part, on the elevation measurements of the elevation data points contained within the respective cells using a second estimation process, and creating an elevation model based, at least in part, on the estimated elevations determined by the first estimation process and the second estimation process for the cells in the first and second groups; and outputting the generated elevation model of the physical landscape.

12. The one or more computer-readable media of claim 11, wherein generating the elevation model of the physical landscape based on the combined set of elevation data points further comprises:

after determining elevation estimates using the first estimation process, but before determining elevation estimates using the second estimation process, modifying the grid, wherein modifying the grid comprises:

modifying cells in the first group for which estimated elevations were determined using the first estimation process, wherein modifying a cell comprises:
removing the elevation data points contained within the cell, and
creating an elevation data point within the cell that identifies a location in the center of the cell and comprises the estimated elevation that was determined for the cell; and using the cells in the modified grid to determine estimated elevations using the second estimation process.

13. The one or more computer-readable media of claim 11, wherein generating the elevation model of the physical landscape based on the combined set of elevation data points further comprises:

generating a confidence model, wherein cells in the grid that are associated with estimated elevations are also associated with uncertainty values, wherein an uncertainty value for a cell indicates a level of confidence associated with the estimated elevation of the cell.

14. A computer system comprising a processor and a memory, wherein the computer system implements an elevation model generation system comprising:

a database comprising two or more groups of elevation records, wherein at least some of the elevation records each comprises coordinates that identify a physical location and an elevation measurement associated with the identified physical location; and an elevation model generator configured to perform operations comprising:

receiving location information for a geographical landscape, based on the location information, identifying at least two of the two or more groups of elevation records that contain elevation records whose coordinates identify physical locations within the geographical landscape, and merging the at least two identified groups of elevation records to create a combined group of elevation records according to a merging strategy, the merging strategy comprising:

generating hulls for the at least two identified groups of elevation records;

identifying two of the hulls that overlap in at least one area of the geographical landscape, and identifying two of the groups of elevation records that are respectively associated with the overlapping hulls;

calculating resolutions for the two groups of elevation records respectively associated with the two overlapping hulls;

determining a method for merging the elevation records of the two groups that identify physical locations in the at least one overlapping area based, at least in part, on the resolutions of the two groups; and merging the elevation records that identify physical locations in the at least one overlapping area based on the determined method.

15. The computer system of claim 14, wherein the elevation model generator is further configured to perform operations comprising:

generating an elevation model for the geographical landscape based on the combined group of elevation records; and storing the generated elevation model in the database.

16. The computer system of claim 14, wherein the database is a spatial database configured to relate records based on geographic information.

17. The computer system of claim 14, wherein the elevation model generation system further comprises an elevation data importer configured to perform operations comprising:

receiving one or more sets of elevation data points in one or more data formats;

converting the one or more sets of elevation data points in the one or more data formats to one or more new groups of elevation records in a common format; and storing the one or more new groups of elevation records in the database in the common format.

18. The computer system of claim 14, wherein:

at least some of the elevation records further comprise uncertainty values associated with their respective elevation measurements; and the elevation model generator is further configured to generate estimated uncertainty values for elevation records, in the at least two identified groups of elevation records.

19. The computer system of claim 14, wherein the elevation model generator is further configured to perform operations comprising:

generating a grid of cells that represents the geographical landscape, such that the physical locations within the geographical landscape identified by the elevation records are contained within cells of the grid; and determining the method for merging the elevation records that identify physical locations in the at least one overlapping area comprises:

determining whether the resolutions of the two groups of elevation records respectively associated with the overlapping hulls are similar, if the resolutions are similar, merging the elevation records that identify physical locations in the at least one overlapping area comprises:

identifying one or more cells in the grid that contain physical locations identified by elevation records from both groups of elevation records; and for each of the identified cells, determining which group, of the two groups, has more reliable elevation records that identify physical locations within an area of the cell, and keeping the elevation records within the cell from the group that has the more reliable elevation records, and otherwise, merging the elevation records that identify physical locations in the at least one overlapping area comprises:

determining which group, of the two groups, has the more reliable elevation records that identify physical locations an area of the entire geographical landscape; and keeping the elevation records that identify physical locations within the at least one overlapping area from the group with the more reliable elevation records.

20. The computer system of claim 19, wherein determining whether the resolutions of the two groups of elevation records associated with the overlapping hulls are similar comprises:

determining a ratio between the resolutions of the two groups;

if the ratio is less than or equal to a predefined similarity threshold and the resolution is greater than or equal to one divided by the predefined similarity threshold, determining that the resolutions of the two groups are similar; and otherwise, determining that the resolutions of the two groups are not similar.

21. The computer system of claim 19, wherein determining which group, of the two groups, has the more reliable elevation records that identify physical locations within an area comprises:

for each group of the two groups, determining a density for the group within the area, wherein the density is a number of elevation records in the group that identify physical locations within the area; and selecting the group with the larger density within the area as the group that has the more reliable elevation records that identify physical locations within the area.

22. The computer system of claim 19, wherein determining which group, of the two groups, has the more reliable elevation records that identify physical locations within an area comprises:

for each group of the two groups, determining an average uncertainty for the elevation records in the group that identify physical locations within the area; and selecting the group with the lower average uncertainty as the group that has the more reliable elevation records that identify physical locations within the area.

23. The computer system of claim 19, wherein determining which group, of the two groups, has the more reliable elevation records that identify physical locations within an area comprises:

for each group of the two groups, determining a number of elevation records in the group that identify physical locations within the area, determining an average uncertainty for the elevation records in the group that identify physical locations within the area, and calculating a ratio for the group between the group's number of elevation records and the group's average uncertainty; and selecting the group with the higher ratio as the group that has the more reliable elevation records that identify physical locations within the area.

24. In a computer system that implements an elevation model generator, a method comprising:

receiving location information that identifies an underwater terrain and at least two sets of bathymetric data points, wherein the bathymetric data points in the at least two sets comprise geo-referenced coordinates for locations in the underwater terrain, depth measurements associated with the locations, and uncertainty values associated with the depth measurements;

generating a grid of cells that represents the underwater terrain, wherein cells comprise geo-referenced coordinates that identify the areas the cells represent in the underwater terrain;

assigning the bathymetric data points, of the at least two sets, to cells in the grid, wherein a bathymetric data point is assigned to a cell if the geo-referenced coordinates of the bathymetric data point are within the cell's area;

merging the at least two sets of bathymetric data points, according to a merging strategy, to create a merged set of bathymetric data points, the merging strategy including:

generating hulls for the sets, wherein a hull for a set comprises a perimeter that encloses the geo-referenced coordinates of the set's bathymetric data points, identifying at least one area of the underwater terrain where hulls for two of the at least two sets overlap, if the overlapping hulls for the two sets have compatible resolutions, merging the bathymetric data points of the two sets on a grid cell basis, wherein merging on a grid cell basis comprises: for at least some of the grid cells, determining that at least one bathymetric data point from each of the two sets are assigned to a given cell, determining which set of the two sets has the less reliable bathymetric data points assigned to the given cell, and removing the less reliable set's bathymetric data points that are assigned to the given cell, otherwise, merging the bathymetric data points of the two sets on a hull basis, wherein merging on a hull basis comprises: determining which set, of the two sets, has the less reliable bathymetric data points within its respective hull, and removing the bathymetric data points of the less reliable set that are within the at least one overlapping area, and combining the bathymetric data points of the at least two sets that have not been removed to create the merged set of bathymetric data points;

generating an elevation model for the underwater terrain based on the merged set of bathymetric data points, wherein the generating comprises:

using a first depth estimation process to generate estimated depths and estimated uncertainty values for cells in the grid that contain a number of bathymetric data points above a specified threshold, combining the estimated depths and estimated uncertainty values generated by the first depth estimation process with the merged set of bathymetric data points, using a second depth estimation process to generate estimated depth and estimated uncertainty values for cells in the grid, based on the combined estimated depths and estimated uncertainty values generated by the first depth estimation process and the merged set of bathymetric data points, and combining the estimated depths and estimated uncertainties generated by the second depth estimation process with the estimated depths and estimated uncertainties generated by the first depth estimation process to create the elevation model of the underwater terrain; and outputting the elevation model of the underwater terrain.

* * * * *